Dec. 30, 1969   J. L. VANNEST   3,486,212
METHOD OF MAKING A BALL-BEARING RETAINER
Original Filed April 8, 1966   2 Sheets-Sheet 1
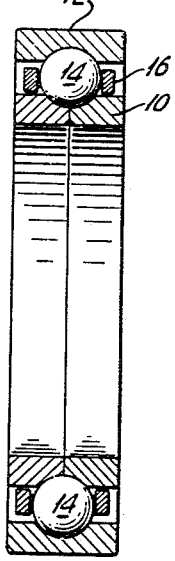
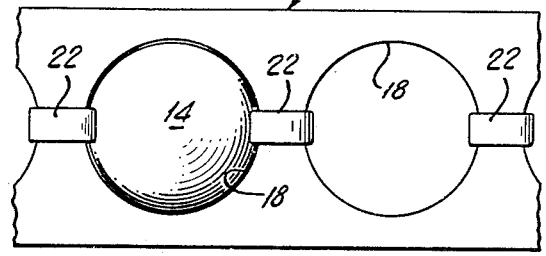
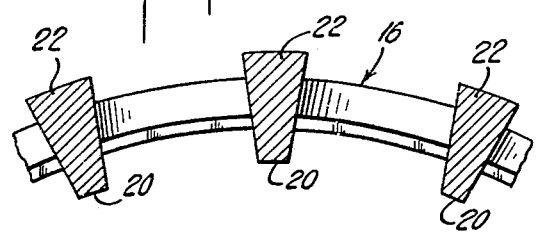
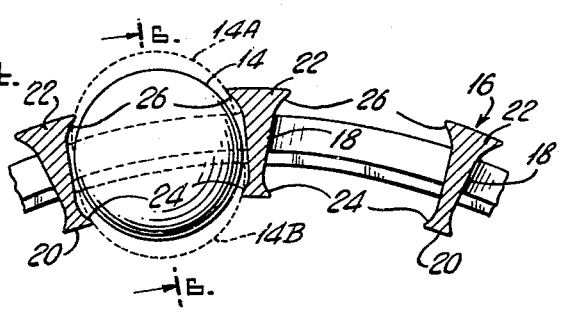
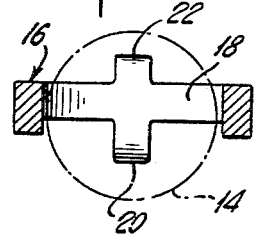
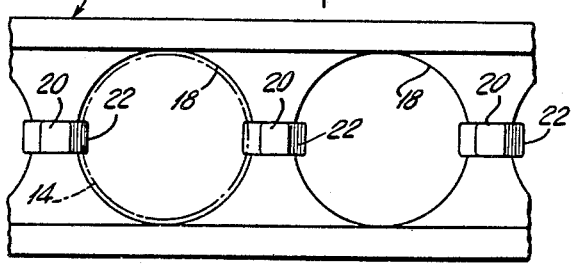
INVENTOR
JAMES L. VANNEST
BY *Hopgood & Calimafde*
ATTORNEYS

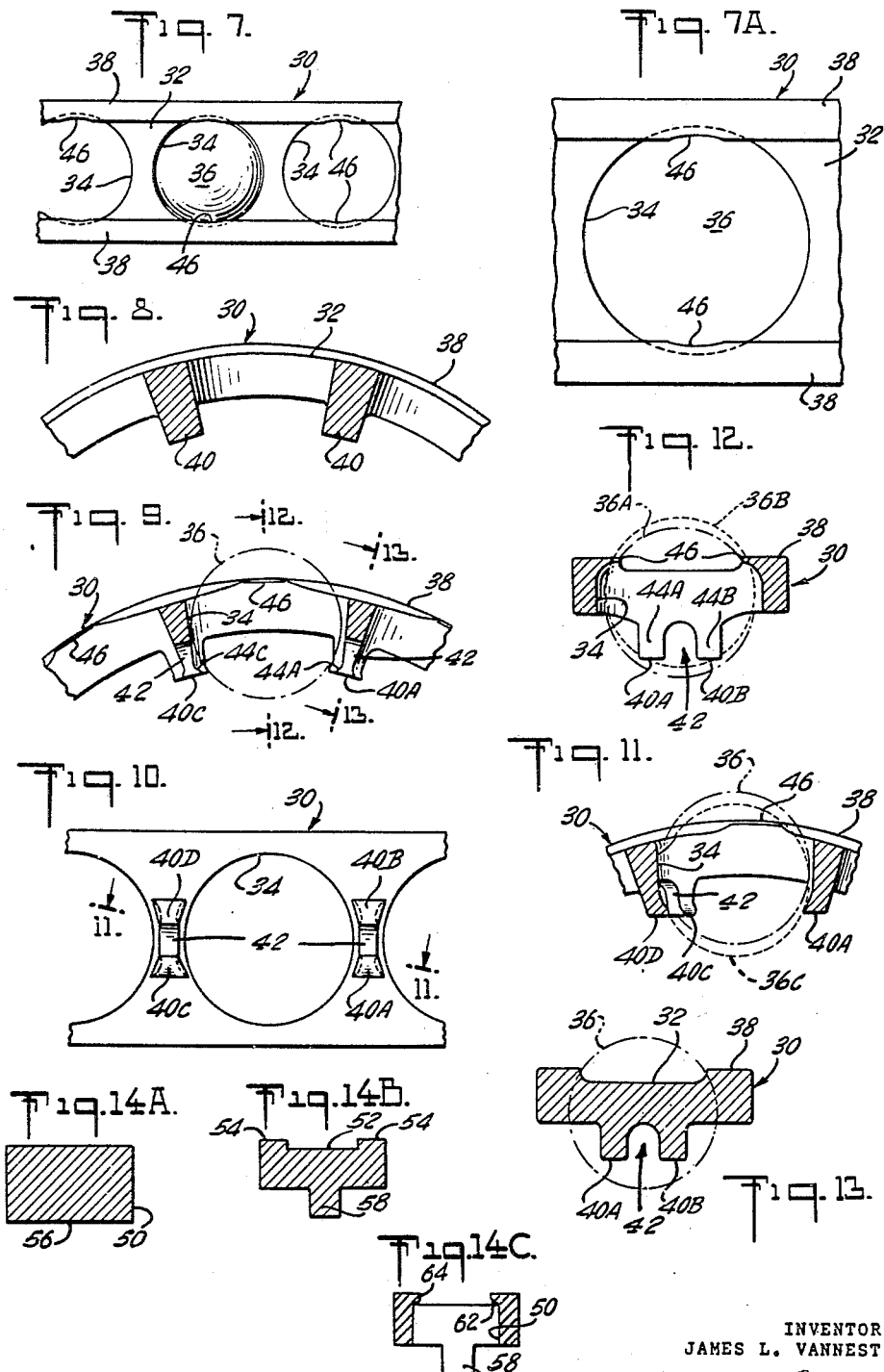

United States Patent Office 3,486,212
Patented Dec. 30, 1969

3,486,212
METHOD OF MAKING A BALL-BEARING
RETAINER
James L. Vannest, New Britain, Conn., assignor, by
mesne assignments, to Textron Inc., Providence,
R.I., a corporation of Delaware
Original application Apr. 8, 1966, Ser. No. 541,243, now
Patent No. 3,399,936, dated Sept. 3, 1968. Divided
and this application Mar. 18, 1968, Ser. No. 739,572
Int. Cl. B21d 53/12; B21h 1/12
U.S. Cl. 29—148.4                    5 Claims

ABSTRACT OF THE DISCLOSURE

The invention contemplates manufacture of a ball-retainer ring for a ball bearing, by initially providing radial holes in an annular ring blank, having inward and outward projections extending radially of the body of the ring blank, at or between adjacent holes. The holes are of less than ball diameter. The holes are then enlarged to a diameter larger than ball diameter, and to an inward extent short of the radially inner limit of the inward projections to form ball-retaining seats on the inward projections; the holes are also enlarged to a diameter larger than ball diameter, in the radially outward direction, to an extent short of the radially outer limit of the outward projections to form ball-retaining seats on the outward projections. Balls which slightly interfere with hole entrances are then assembled by snap action, against slight resilient deflection of the projections, into unit-handling relation with the retainer ring.

---

This is a division of application, Ser. No. 541,243, filed Apr. 8, 1966, now Patent No. 3,399,936, dated Sept. 3, 1968.

This invention relates to a retainer for a ball bearing and to a method for making the same.

In the manufacture of conventional retainer rings of the type referred to herein, means in the form of ball retaining nibs or fingers are provided on the outer surface of the retainer to maintain the balls in their respective pockets in the retainer. These nibs are formed by machining the retainer in such a manner that the balls may be inserted in their pockets in a radially inward direction past the nibs. The balls are then restrained from falling out of their pockets by bending at least a portion of each outer nib into a position of interference into the path of entry of the balls.

The retainer thus made has several important disadvantages. One of these is that considerable difficulty is encountered in producing just the right amount of bending of each nib so that the associated ball is sufficiently restrained from falling out of its pocket; at the same time, the bending must not be so great that insufficient ball freedom in the radial direction results or that cracking of the nib and failure thereof are likely to result during operation. As a matter of actual experience, it has been found that the amount of bending of the nibs required to retain the balls in their pockets not infrequently causes cracking of the nib and failure of the bearing during operation. A further disadvantage is that uniformity in the amount of bending of the nibs from pocket to pocket is extremely difficult to achieve.

Accordingly, an object of the invention is to provide a method for making a bearing retainer having the desirable features of greater reliability, longer life and a lower failure rate.

Yet another object is to provide a method for making a bearing retainer having a more uniform degree of radial ball freedom among the various balls in a given retainer.

A further object is to achieve the foregoing objects with a method which inherently assures symmetry of ball-retaining contour formations both before and after assembly into unit-handling relation with a complement of balls.

All of the objects, features and advantages of this invention and the manner of attaining them will become more apparent and the invention itself will be best understood by reference to the following description of an embodiment of the invention taken in conjunction with the accompanying drawing, in which:

FIG. 1 is a diametral sectional view through a ball bearing, showing one form of retainer according to the invention, FIG. 2 is a fragmentary development of a section of a retainer according to a first embodiment of the invention, as viewed from the outside of the retainer, FIG. 3 is a generally axially viewed fragment of the retainer shown in FIG. 2, before machining to its finished form, FIG. 4 is a view similar to FIG. 3 but illustrating the retainer in its finished form, FIG. 5 is a fragmentary development of a section of the retainer of FIG. 2 as viewed from the inside of the retainer, FIG. 6 shows a transverse section of the retainer taken on the line 6—6 of FIG. 4, FIG. 7 is a fragmentary development of a section of a retainer according to a second embodiment of the invention, as viewed from the outside of the retainer, FIG. 7A is a view, greatly enlarged, of a section of the retainer of FIG. 7, showing details of means for restraining the balls from falling radially outwardly out of the retainer, FIG. 8 is a generally axially viewed fragment of the retainer shown in FIG. 7, before machining to its finished form, FIG. 9 is a view similar to FIG. 8 but illustrating the retainer in its finished form, FIG. 10 is a fragmentary development of a section of the retainer of FIG. 7 as viewed from the inside of the retainer, FIG. 11 is a view taken along the line 11—11 of FIG. 10, FIG. 12 shows a transverse section of the retainer of FIG. 7 taken on the line 12—12 of FIG. 9.

FIG. 13 shows a transverse section of the retainer of FIG. 7 taken on the line 12—12 of FIG. 9, FIGS. 14A, 14B and 14C show transverse sectional views illustrating different steps during the manufacture of a retainer according to a third embodiment of the invention, these views being taken at a ball center point on the retainer, such as at 6—6 as seen in FIG. 4.

Briefly stated, there is provided in accordance with the invention, an improved retainer and a method for making the same wherein an annular ring is provided having a plurality of circumferentially spaced holes or pockets for reception of the balls. Between the pockets and extending generally radially inwardly are fingers provided with suitable seats for retaining the balls in the pockets. These fingers are formed of such material and dimensions as to be sufficiently resilient to permit sidewise elastic deformation thereof to allow the balls to be inserted into the pockets by urging the same in a radially outward direction. Upon the application of sufficient force the balls "spread" the fingers sufficiently to allow the balls to "pop" into the pockets. The balls are then restrained, in unit-handling relation with the ring, against falling out of the pockets in an inwardly radial direction by return of the fingers to their unstressed or normal positions.

The balls are restrained from falling radially outward out of the retainer by restraining means which preferably form line contact with the surface of the ball in each pocket. Such ball outer restraining means may take various forms.

The retainer in its rough or original form preferably includes ball pockets or radial holes which are slightly smaller than the diameter of the balls to be received therein; the ring, thus apertured, has an inwardly extending projection and an outwardly extending projection adjacent each hole and of limited arcuate extent about the hole axes at the location of adjacency to each end of each hole. These pockets are then enlarged by means of a suitable pocket-enlarging tool. This tool may also form generally spherical seats on the inwardly directed fingers between the pockets so that the balls therein may rest radially inwardly therein. The ball outer restraining means are also preferably formed by means of the same tool which forms these generally spherical seats; such tool may be, for example, the well known cam-actuated recessing tool, or may be any other suitable machine arrangement. The outer restraining means thus formed may also take the form of a seat. In one embodiment this latter seat means may provide line contact between the retainer and the balls generally in the central region intermediate the sides of the retainer ring; in another embodiment, such line contact may be provided generally toward the edges of the retainer ring by generally annular flanges adjacent the sides of the retainer.

The pockets thus formed in accordance with the invention are, generally speaking, formed cylindrically or circularly by the cam-actuated recessing tool so that the outer restraining means and also the inwardly directed fingers so formed prevent movement of the ball out of the pocket either inwardly or outwardly, except upon the application of considerable radial force on the balls.

Referring now to the drawing, FIG. 1 illustrates a complete ball bearing which embodies an inner ring 10 and an outer ring 12 with a plurality of balls 14 therebetween. The balls are held in a retainer 16 which may take a variety of specific forms in accordance with different embodiments of the invention. In the particular form shown in FIG. 1, the inner ring 10 comprises two half-sections held together in any manner well known to those skilled in the art.

FIGS. 2–6 show different views of the retainer 16 in accordance with a first embodiment of the invention. The retainer 16 shown may be made of a variety of suitable materials such as, for example, bronze or steel, is annular in shape, and is provided with circumferential equally spaced generally radial ball pockets 18. Between adjacent ball pockets 18 there are provided radially inwardly directed fingers 20 and radially outwardly extending lugs 22. The pockets 18 may be drilled, cast or forged, as seen in FIG. 3, to a size smaller than that of the diameter of the balls to be received therein, these pockets being enlarged by suitable machining to proper size before insertion of the balls 14. In the preferred form, a suitable cam-guided recessing tool is run axially into each pocket and forms a generally cylindrical shaped pocket to a size to properly receive the balls, as seen in FIG. 4, the machining being continued inwardly so as to form generally spherical surfaces 24 on the inner ends of the fingers 20. The two facing spherical surfaces 24 on each pocket 18 form generally spherical seats for the balls to prevent them from dropping radially inwardly out of the retainer.

The lugs 22 at the radially outer side of the retainer 16 are preferably formed also by the same cam-actuated recessing tool that is used to form the spherical surfaces 24 on the fingers 20. Since this tool cuts a circular path, the lugs 22 present generally spherical surfaces 26 which also face one another.

In FIG. 4, one of the balls 14 is illustrated in various positions. The position indicated by the solid line 14A is that of the ball when the retainer and balls are mounted in the bearing of FIG. 1. The lower position indicated by the dashed lines 14B illustrates the position of the ball when held in its inner radial position by the spherical surfaces 24 on the fingers 20. The position of the ball indicated by the upper dashed lines 14C indicates the uppermost position of the ball, restrained in its outermost position in its pocket against radially outward movement by the generally spherical surfaces 26 on the lugs 22.

The ball 14 is inserted into the pocket as seen in FIG. 4 by "popping" the same in a radially outward direction past the spherical surfaces 24 on the fingers 20. For this purpose, the fingers 20 are dimensioned so as to have a length/thickness ratio that will provide sufficient elasticity to allow the ball to spread the fingers 20 laterally enough to cause the ball to pass into its pocket without exceeding the elastic limit of the fingers. As soon as the ball has passed into the pocket, the fingers of course return to their normal position to restrain the ball from falling radially inwardly out of its pocket.

FIGS. 7–13 show different views of a retainer 30 in accordance with a second embodiment of the invention. The retainer 30 includes a central body portion 32 which extends around the ring and comprises the main ring body portion. A plurality of equally spaced generally radial ball pockets 34 are provided in the central body portion 32 for receiving balls 36. Annular flanges 38 are provided at the edges of the retainer 30 and are spaced from one another at a distance slightly less than the diameter of the balls 36 to be received in the pockets 32. These flanges 38 extend radially outwardly from the main body portion 32 between the balls. Between adjacent ball pockets 34 there are provided radially inwardly directed fingers 40A, 40B, 40C and 40D, see especially FIGS. 9, 10, 12 and 13. As will be best appreciated from these figures, four fingers such as those 40A–40D are associated with each ball pocket 34 and each pair of adjacent fingers such as 40A–40B or 40C–40D are spaced from one another by a gap 42 as shown in FIG. 12. In the preferred form of the ring as originally cast the finger pairs 40A–40B and 40C–40D each comprise one continuous inwardly extending metal portion 40 as seen in FIG. 8, with the gap 42 non-existent. These metal portions 40 are then suitably machined to produce the gap 42, thus forming the finger pairs 40A–40B and 40C–40D (see FIGS. 9, 10 and 12). This embodiment may also utilize a single inwardly extending finger between adjacent pockets, as will be understood.

As in the first embodiment of the invention described above, the pockets 34 in this second embodiment may be drilled, cast or forged, as seen in FIG. 8 to a size smaller than that of the diameter of the balls to be received therein, these pockets also being enlarged by suitable machining to proper size before insertion of the balls. Such machining may be accomplished using the cam-guided recessing tool referred to above, to form the generally cylindrically shaped pockets 34 to the proper size to receive the balls 36. As the tool is moved axially into the pocket 34, generally spherically shaped surfaces 44A, 44B, 44C and 44D are formed on the inwardly extending fingers 40A, 40B, 40C and 40D respectively. These spherically shaped surfaces 44A–44D form generally spherical seats for the balls 36 to prevent the same from dropping radially inwardly out of the retainer 30.

The cam-actuated recessing tool is also used to form ball outer-limit restraining means which in the present embodiment of FIGS. 7–13 take the form of arcuate projections 46, these projections extending generally axially to the retainer 30 and being most clearly seen in FIG. 7A and FIG. 12. These arcuate projections 46 are formed generally opposite one another on the opposing flanges 38, two such projections being provided for each ball pocket 34. The projections 46 are spaced at a distance from one another whereby the maximum distance between any two opposing projections is less than the diameter of the ball so that the same may be restrained from falling radially outwardly out of the retainer. Further, these projections 46 are very narrow in height at their points of contact with the ball 36 and are preferably so narrow as to provide substantial line contact with the ball they serve to restrain.

In FIG. 12, one of the balls 36 is illustrated in two different positions. The position indicated by the solid line 36A is that of the ball within the ball-filled retainer mounted in its bearing assembly. The upper position indicated by the dashed lines 36B illustrates the position of the ball when held in its outer radial position by the arcuate line-contact projections 46 on the flanges 38. In FIG. 11, the dashed lines 36C illustrate the ball 36 in its lowermost position where it is restrained from falling radially inwardly out of the retainer by virtue of the seat provided by the four generally arcuate surfaces 44A–44D on the inwardly extending fingers 40A–40D.

The ball 36 is inserted into its pocket in a manner similar to that described above in connection with the first embodiment. Thus the ball 36 is urged into its pocket 34 by applying radially outwardly directed force against the ball to thereby spread the fingers 40A–40D sufficiently to allow the ball to pass into the pocket, after which the fingers return to their normal positions to restrain the ball from falling radially inwardly out of its pocket. The length/thickness ratio must of course be chosen, as above, for the particular retainer material employed and the dimensions between opposing fingers 40A–40D relative to the ball diameter, so that the elastic limit of the fingers is not exceeded as the ball is "popped" into its pocket.

FIGS. 14A, 14B and 14C illustrate a third embodiment of the retainer of this invention and a method for making the same. The structure of this third embodiment includes the radially inwardly directed single fingers 20 of the first embodiment and the outer flange 38 feature of the second embodiment.

The third embodiment structure of FIGS. 14A, 14B and 14C is preferably manufactured by a somewhat different method than employed above and includes first forming an annular ring 50 as seen in FIG. 14A. This ring 50 may be formed by any suitable method such as for example casting, forging, machining or the like. This ring 50 is next machined to form a central annular recess 52, thereby producing the annular flanges 54 adjacent thereto. Suitable machining operations are also carried out on the inner surface 56 of the ring 50 to produce the inwardly extending fingers 58 as seen in FIG. 14B. Ball pockets 60 similar to those already described are then formed in the retainer ring body 50 between the inwardly extending fingers 58. Each ball pocket 50, see FIG. 14C, is preferably formed by the cam-actuated recessing tool or other suitable machine arrangement, which is caused to advance in a radially outward direction to an accurately predetermined point 62, thereby forming the flange projections 64 as seen in FIG. 14C. As with the construction of the second embodiment above, it will be clear that the balls will be restrained from falling radially outwardly out of the retainer of FIG. 14C by the outer flange projections 64 and that the same will make generally line contact therewith.

It will be clear that during actual manufacture the order of the various steps just described may be varied. For example, the ball pockets 60 may be formed prior to the formation of the inwardly extending fingers 58. Other modifications will occur to those skilled in the art.

In accordance with the invention described above, it will be appreciated that there is provided an improved retainer ring construction and also a method for making the same whereby the advantage of greater reliability, longer life and lower failure rate during operation of the retainer are enjoyed. Additionally, the retainer thus made provides a more uniform degree of radial ball freedom among the various balls in a given retainer while maintaining the foregoing advantages.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A method for making an annular ball retainer ring comprising the steps of
    forming a ring with a plurality of spaced radial holes with an inwardly extending finger between adjacent holes and with portions extending radially outwardly of the body of said ring, the holes having a diameter smaller than the diameter of the balls to be received therein,
    enlarging each of said holes with a cam-actuated recessing tool to a diameter larger than that of said balls and inwardly a predetermined distance short of the radially inner limit of said inwardly extending fingers to form ball-retaining seats on said fingers whereby said fingers have generally concentric concave facing surfaces,
    and cutting each of said radially outwardly extending portions with said tool substantially concentrically with the axis of each respective hole to form two separate arcuate surfaces generally opposite one another at each hole which have line contact portions thereon spaced from one another at a distance slightly less than the diameter of said balls, whereby said two arcuate surfaces cooperate with one another to provide line contact with the ball associated therewith to hold the same from falling radially outwardly out of its pocket.

2. A method for making an annular ball retainer ring comprising the steps of
    forming a ring with a plurality of spaced radial holes with a single inwardly extending finger and a single outwardly extending lug formed between adjacent holes, the holes having a diameter smaller than the diameter of the balls to be received therein,
    enlarging each of said holes with a cam-actuated recessing tool to a diameter larger than that of said balls and inwardly a predetermined distance short of the radially inner limit of said inwardly extending fingers to form ball-retaining seats on said fingers whereby said fingers have generally concentric concave facing surfaces,
    and cutting each of said outwardly extending lugs with said tool substantially concentrically with the axis of each respective hole to form two separate arcuate surfaces generally opposite one another at each hole which have line contact portions thereon spaced from one another at a distance slightly less than the diameter of said balls, whereby said two arcuate surfaces cooperate with one another to provide line contact with the ball associated therewith to hold the same from falling radially outwardly out of its pocket.

3. A method for making an annular ball retainer ring comprising the steps of
    forming a ring with a plurality of spaced radial holes smaller than the balls to be received therein, with an inwardly extending finger between adjacent holes and with annular flanges spaced from one another by a distance slightly less than the diameter of said balls, said flanges extending radially outwardly beyond the body of said ring,
    enlarging each of said holes with a cam-actuated recessing tool to a diameter larger than that of said balls and inwardly a predetermined distance short of the radially inner limit of said fingers to form ball-retaining seats thereon, whereby said fingers have generally concentric concave facing surfaces,
    and forming with said tool arcuate line contact portions on the outer regions of said flanges which are substantially concentric with the axis of each respective hole, generally opposite one another at each hole, and spaced from one another at a distance slightly less than the diameter of said balls, whereby said portions cooperate with one another to form line contact with the ball associated therewith to hold the same from falling radially outwardly out of its pocket.

4. A method for making an annular ball retainer ring comprising the steps of
  forming a ring having a main body portion,
  providing spaced inwardly extending fingers on said ring,
  forming portions on said ring which extend radially outwardly of the main body portion of said ring,
  and forming ball-receiving holes between said spaced fingers with a cam-actuated recessing tool by moving the same inwardly a predetermined point short of the radially inner limit of said inwardly extending fingers to form ball-retaining seats thereon, whereby said fingers have generally concentric concave facing surfaces,
  and cutting said radially outwardly extending portions with said tool substantially concentrically with the axis of each respective hole to form two separate arcuate surfaces generally opposite one another at each hole which have line contact portions thereon spaced from one another at a distance slightly less than the diameter of said balls, whereby said two arcuate surfaces cooperate with one another to provide line contact with the ball associated therewith to hold the same from falling radially outwardly out of its pocket.

5. A method for making an annular ball-retainer ring, comprising the steps of:
  forming a ring with a plurality of spaced radial holes smaller than the balls to be received therein, with an inwardly extending projection and an outwardly extending projection adjacent each hole and of limited arcuate extent about the hole axes at the location of adjacency to each end of each hole,
  and enlarging each of the holes to a radially extending bore of diameter larger than that of said balls, such enlargements extending radially inwardly a predetermined distance short of the radially inner limit of said inward projections to form ball-retaining seats thereon, such enlargement extending radially outwardly a predetermined distance short of the radially outer limit of said outward projections to form ball-retaining seats thereon,
  whereby balls which slightly interfere with such seats at hole ends may be thereafter assembled into loosely retained unit-handling relation with said ring by snap-action involving transient resilient local deflection at the seats.

References Cited

UNITED STATES PATENTS

| | | | |
|---|---|---|---|
| 2,657,106 | 10/1953 | Lovell et al. | 308—217 |
| 2,765,518 | 10/1956 | Lovell et al. | 29—558 X |
| 2,911,268 | 11/1959 | Staunt | 308—201 |
| 2,933,803 | 4/1960 | Schaeffler. | |

THOMAS H. EAGER, Primary Examiner

U.S. Cl. X.R.

29—558; 308—207